(12) United States Patent
Walker et al.

(10) Patent No.: US 11,501,472 B2
(45) Date of Patent: Nov. 15, 2022

(54) COLOR ADJUSTMENT SYSTEM FOR DISPARATE DISPLAYS

(71) Applicant: Clemson University, Clemson, SC (US)

(72) Inventors: Erica B. Walker, Clemson, SC (US); D. Hudson Smith, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 290 days.

(21) Appl. No.: 17/033,808

(22) Filed: Sep. 27, 2020

(65) Prior Publication Data

US 2021/0097733 A1  Apr. 1, 2021

Related U.S. Application Data

(60) Provisional application No. 62/907,277, filed on Sep. 27, 2019.

(51) Int. Cl.
| | |
|---|---|
| *G06T 11/00* | (2006.01) |
| *H04N 5/232* | (2006.01) |
| *G06T 7/90* | (2017.01) |
| *G09G 3/20* | (2006.01) |

(52) U.S. Cl.
CPC .............. *G06T 11/001* (2013.01); *G06T 7/90* (2017.01); *G09G 3/20* (2013.01); *H04N 5/23229* (2013.01); *G06T 2207/10016* (2013.01); *G06T 2207/10024* (2013.01); *G06T 2207/20081* (2013.01); *G09G 2320/0666* (2013.01)

(58) Field of Classification Search
CPC ..................... G06T 11/001; G06T 7/90; G06T 2207/10016; G06T 2207/10024; G06T 2207/20081; G06T 2207/20084; G06T 2207/20224; G06T 5/008; G06T 5/50; G09G 3/20; G09G 2320/0666; G09G 3/2003; H04N 5/23229; H04N 9/73
See application file for complete search history.

(56) References Cited

U.S. PATENT DOCUMENTS

2012/0177288 A1* 7/2012 Chaussat ............... G06T 11/001
382/218

* cited by examiner

*Primary Examiner* — Christopher Wait
(74) *Attorney, Agent, or Firm* — Kim and Lahey Law Firm, LLC; Douglas W. Kim

(57) ABSTRACT

This system is designed to color correct a targeted color or colors in a video stream comprising: a computer device having a computer readable medium; and, a set of computer readable instructions embodied on the computer readable medium that are configured to: receive a dataset that includes one or more pairs of video frames where a first frame of the pair of an incorrect color frame and the second frame of the pair is a color correct frame, using a machine learning module to create a mask according to the dataset, receiving an image, correcting the image, and, transmitting the corrected image to a display.

26 Claims, 9 Drawing Sheets

COLOR ADJUSTMENT SYSTEM FOR DISPARATE DISPLAYS

RELATED APPLICATION

This application is a non-provisional patent application claiming priority from U.S. Provisional Patent Application Ser. No. 62/907,277 filed Sep. 27, 2019 titled "COLOR ADJUSTMENT SYSTEM FOR DISPARATE DISPLAYS" which is incorporated herein by reference.

BACKGROUND OF THE SYSTEM

1) Field of the Invention

This processing system is directed to real-time color correction of specific targeted colors on an image or video frame across all image capture devices that take in color-incorrect images and output color-correct images.

2) Description of the Related Art

Color management includes the process of capturing a color using an input device (e.g. video camera) and displaying it on a screen with the goal of displaying the same colors or range of colors regardless of the original source of the input images. This functionality is needed as capture devices and displays do not interpret digital colors in the same way. For example, managing a brand color on large-format video displays during live sporting events is a complex problem that has mostly been performed manually by one or more specifically trained craftspeople.

Color visualization on video displays is impacted by many factors including the original video source, the screen's built-in technology and native gamut, and the ambient light at the facility, which can range broadly based on the time of day and weather, such as for outdoor fields to mixed-artificial lighting such as for indoor facilities. One traditional way of solving this problem is to develop a library of adjustment "filters" that take into consideration factors such as time of day, camera, and lens. However, this attempted solution is not easily adapted when there are many cameras capturing the event or other rapidly changing conditions. Using "filters" does not have the ability to deliver accurate results in real time. In addition, the "filters" impact colors across the entire image, not just the specific targeted color. A negative result of this is that adjusting the image to correct the display of one color (e.g. orange) can negatively impact the display of other non-targeted colors (e.g. green). In one example, while the team uniforms may be the proper color, the grass on the playing field is negatively impacted and may shift too blue.

As technology advances, this is a problem because fans recognize inconsistencies in brand color display and are vocal on social media when their team's colors do not appear correctly causing harm to the brand and the brand owner. This is especially true as more and more events locations add video to the venue and the immersive experience that can be provided with large format displays can allow venues to attract advertisers and sponsorships. These advertisers and sponsors can have marketing and brand guidelines which can dictate color and other display attributes.

For example, during a college football event, the brand colors of the home team were incorrectly displayed on the screens and looked similar to that of the visiting team. Examples of fan complaints included "Team One is looking good in Team Two blue tonight", "Hey @ESPNCFB @ESPN can you send a truck engineer who knows how to white balance a camera to Team One? Our purple uniforms look like Team Two blue. #ESPNfail", "hello 911, the color balance has Team One looking like they're playing in Team Two blue, plz advise???" and "Owner spent over $1 billion on his stadium, why couldn't he have installed lights that made his teams pants actually look silver rather than greenish?"

The current system used to correct these issues includes displaying live image footage from all cameras feeds as a grid on a wall of standard television screens to the technician. On a second, small color-accurate screen, the technician is shown individual feeds and makes visual adjustments while referencing display waveforms and vector scope readings. On a board in front of the technician, each incoming feed has a set of adjustments such as iris (impacts the brightness) and individual red, green, and blue knobs (adjust overall color). These technicians are true artists as they make adjustments (e.g. shading and painting) across all the camera feeds in real time. One of the many disadvantages to this system is that the majority of these adjustments are made to the brightness levels and the RGB channels to alter the overall color, rather than attempting to reproduce correct brand colors. Typically, the technician focuses on consistency from camera to camera because inconsistencies between cameras are highly noticeable. The technician does not focus on true color correctness.

Another challenge for the traditional approach is the sensitivity to lighting conditions, camera models, camera angles, etc. The "filter" approach can use look up tables to attempt to correct color. However, each capture device needs a properly calibrated and developed look up table that is specific to that capture device. Variations over time occur with this system as look up tables become outdated, lighting conditions change, the capture device color characteristics change with time and other factors requiring constant adjustments to the look up table for color correctness.

Further, the disadvantages of the traditional approach are magnified for live sporting events given the multiple capture devices. For applications such as traditional film and television, editors have the opportunity to send the entire final video production to be color graded once the edit is completed. During this grading process, adjustments can be made both between clips and across clips to provide a cohesive visual feel that matches the desired look and feel of the film. With film and television, brand color accuracy is not a priority, rather consistency and the overall artistic feel are more important. Proper color correction for brand consistency is an important factor for still images, recorded video, and live broadcasts of events. For live events, such as sporting events, color correction can be especially important as the action is relatively fast.

Therefore, it is an object of the present invention to provide a color management system for managing the consistent display of images that are received from multiple capture devices.

It is an object of the present invention to provide for a color management system that manages targeted colors of images received from multiple capture devices on a display.

BRIEF SUMMARY OF THE SYSTEM

The above objectives are accomplished by providing a system for color management of a targeted color in an image comprising: a processing system in communications with a video capture device; a dataset in communications with the processing system generated by a machine learning module wherein the machine learning module includes a pair of images wherein a first image is a training original image and a second image is a training color corrected image; an adjustment layer created according to the dataset; and, a set of computer readable instructions for: receiving an original image from the video capture device, retrieving an adjustment layer according to the dataset, applying the adjustment layer to the original image to create a color corrected image, and transmitting the color correct image to a display device, The system can target a color in a video stream for correction and include a processing system in communications with a video capture device and having a processor; a dataset in communications with the processing system generated by a machine learning module wherein the machine learning module includes a pair of images wherein a first image is an original image and a second image is a color corrected image; an adjustment layer created according to the dataset; a set of computer readable instructions included in the processing system that, when executed by the processor, perform the steps of: receiving an original video feed having a plurality of frames from the video capture device, retrieving an adjustment layer according to the dataset; applying the adjustment layer to the original video feed to create a color correct video feed, and, transmitting the color correct video feed to a display device.

The system can include a computer readable media in communication with the processing system; a correction mask stored on the computer readable media wherein the correction mask represents a region of an original image in the original video feed to receive color correction; and the set of computer readable instructions can include instructions for retrieving the correction mask from the computer readable media and applying the adjustment layer to the region of a frame included in the plurality of frames included in the original video feed.

The correction mask can include a correction image mask for each original image in the original video feed. The correction mask can represent an addition and subtraction of color between the original image and the color corrected image. The correction mask can be shifted and rescaled to represent a correction image. The correction mask can represent changes to an attribute taken from the group consisting of hue, saturation, lightness, or any combination thereof. A machine learning module can be configured to receive the plurality of frames from an original video feed and apply a correction mask to a set of target frames included in target video feed. The machine learning module is configured to use convolutional neural network for processing the original video feed. The machine learning module can include modules taken from the group consisting of convolution, batch normalization, rectified linear unit, drop out or any combination thereof. The machine learning module can include a stochastic gradient descent configured to analyze the original video feed.

The set of computer readable instructions can include instructions for applying the adjustment layer to the original video feed to create a color correct video feed in real time. The processing system can be disposed in-line with the video capture device. The processing system can be disposed between the video capture device and a display. The processing system can be included in the video capture device. The processing system can be disposed in a display device.

A system for color management of a targeted color in a video stream can include a set of non-transitory computer readable instructions stored on a computer readable media that, when executed by a processor, preform the steps of: receiving an original video feed from a video capture device, retrieving a dataset from the computer readable media having a plurality of paired images where a first image of each pair of the paired images is an original image and a second image of each pair of the paired images is a color-corrected image representing modifications to the first image in response to matching a target color, retrieving a correction mask from the computer readable media; and, correcting a color of the original video feed according to the dataset, the color correction mask, and a machine learning module to produce a color corrected video feed.

The system can include machine learning module taken from the group consisting of convolution, batch normalization, rectified linear unit, drop out or any combination thereof.

The system can include a set of non-transitory computer readable instructions that, when executed by a processor, preform the steps of: receiving an original video feed, applying an adjustment layer created according to a dataset having a plurality of paired images where a first image of each pair of the paired image is an original training image and a second image of each pair of the paired images is a color-corrected image representing modifications to the first image in response to matching a target color to the original video feed, correction mask and a machine learning module to create a color correct video feed, and, transmitting the color correct video feed to a display.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

This system receives color-incorrect images from a video capture device and outputs color-correct images. When applied frame by frame to a video feed, this system can be integrated into live video production for on-the-fly color correction. Using machine learning, this system uses a "pattern" that represents the relationship between the color-incorrect and color-correct images. A dataset having a set of paired examples of the incorrect and correct images is used by the system. By receiving a predetermined set of such paired examples, the machine learning module of this system learns to predict the correct color from an incorrect color. The machine learning module can then be integrated into a software application that, when executed by a processor, provides various color correction tasks such as static image color correction or on-the-fly video color correction.

Figure 1A:
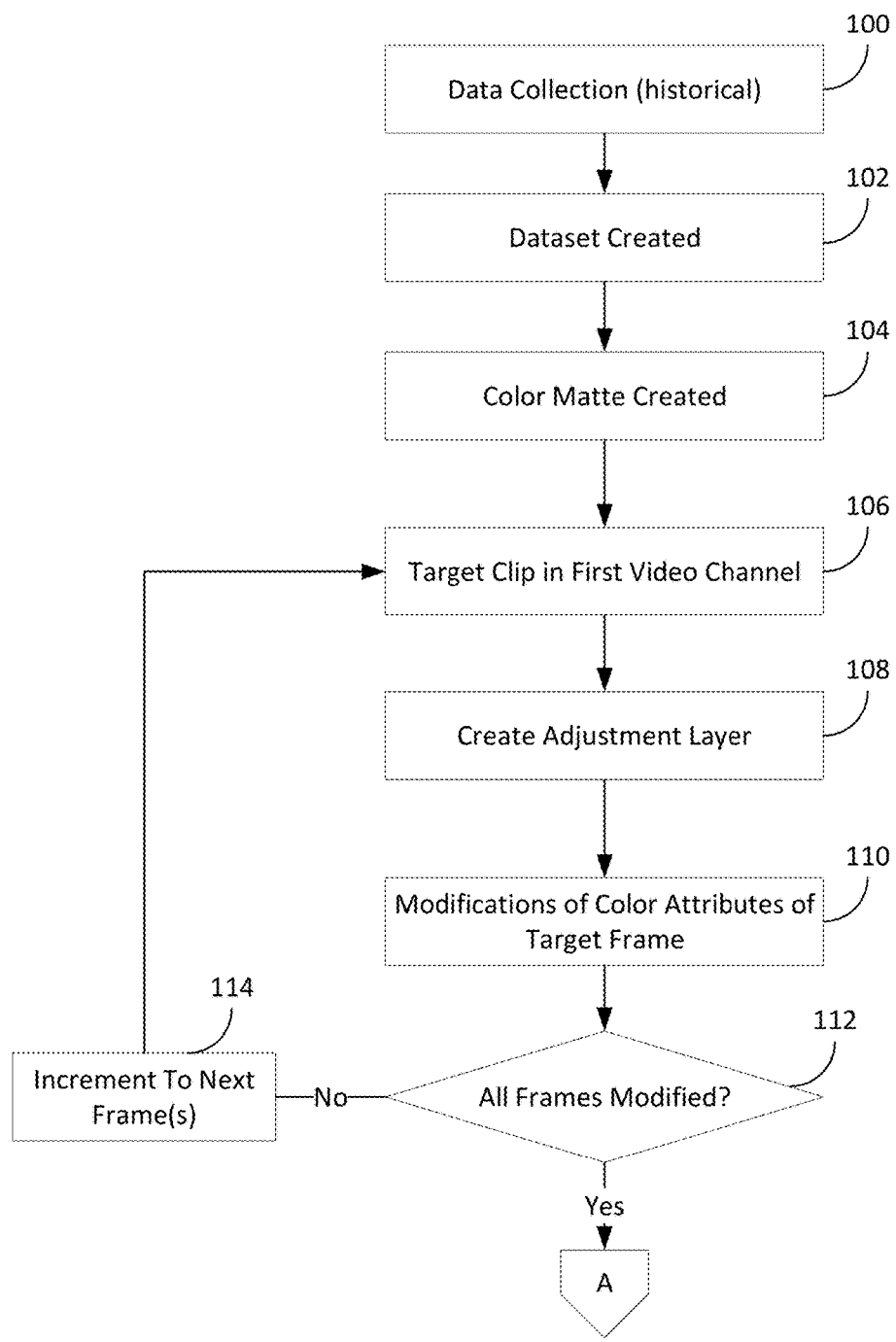
FIG. 1A is a flowchart of aspects of the system.
Figure 1B:
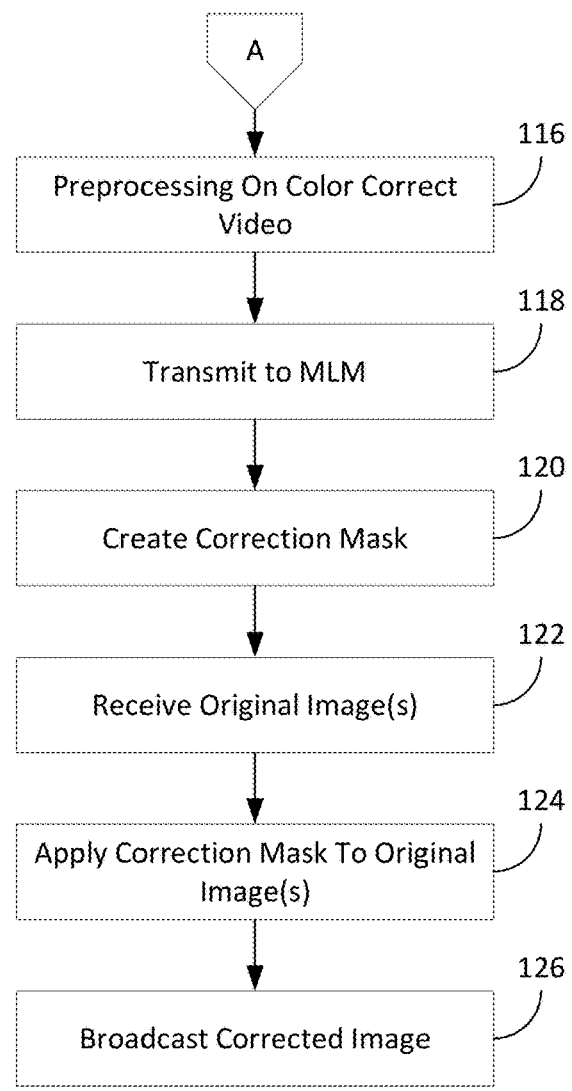
FIG. 1B is a flowchart of aspects of the system.
Figure 2:
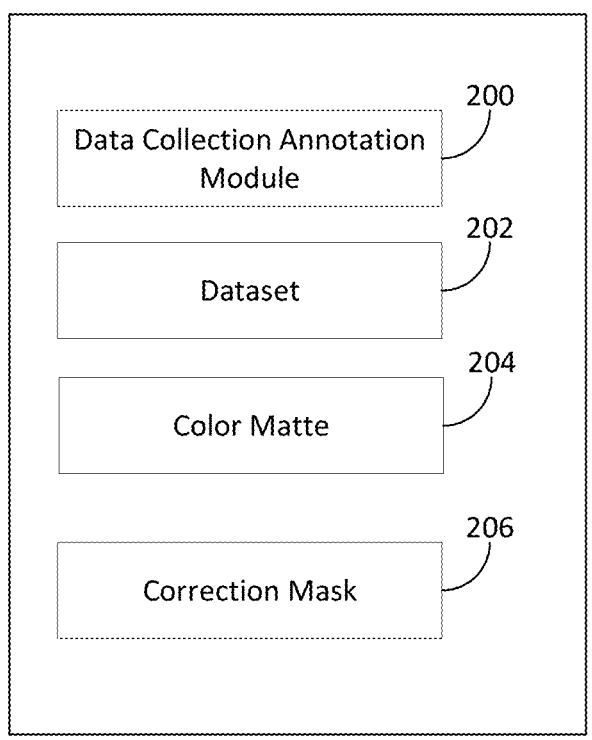
FIG. 2 is a schematic of aspects of the system.

Referring to FIGS. 1A, 1B and 2, the system can include a data collection and annotation module 200 which can be configured to gather color-incorrect images and produce corresponding color-correct images at 100. For example, video footage taken from a college athletic department of a past sporting event can be used as the baseline input. A dataset 202 that includes a library of color-incorrect and corresponding color-correct images can be created using a color management software system that provides for color manipulation and grading at 102. It is preferred that video footage is used so that multiple frames can be adjusted simultaneously. While still images can be used, it is a more time-consuming process. When using color management software system, preferences can be set that allows color management of the display when editing video.

Figure 3A:
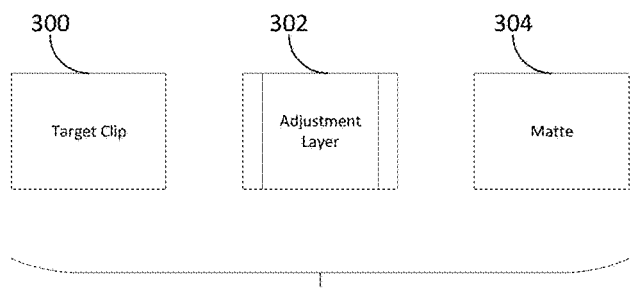
FIG. 3A is a schematic of aspects of the system.
Figure 3B:
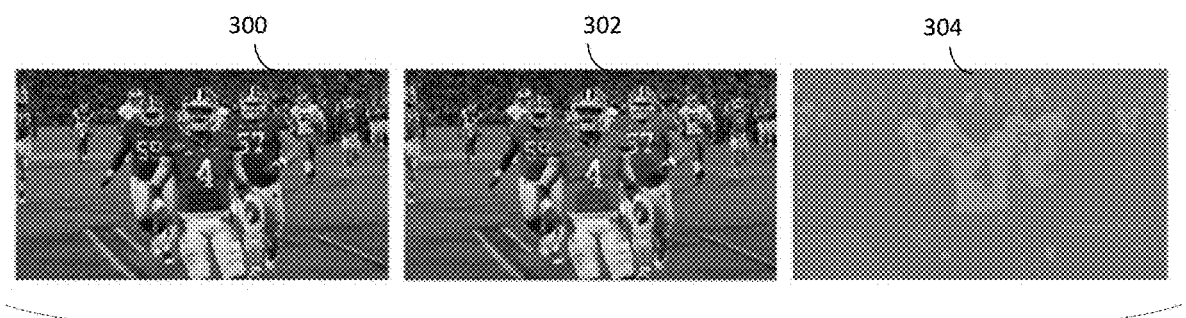
FIG. 3B is a schematic of aspects of the system.

Raw footage can be imported into the color management software system in its native format. Then a color matte 204 is created at 104. In one embodiment, the color matte can have dimensions of 1920 pixels width and 100 pixels height. The color matte can be filled with the target brand color RGB values. For example, if a university team colors are orange, the target color or target brand color can be the team color orange. In one embodiment using a color management software system, the target clip 300 (FIGS. 3A and 3B) selected at 106 can be placed in a fist video channel and the color matte 304 can be placed in a second video channel. An adjustment layer 302 is created at 108 and placed on a third video channel. The adjustment layer, made by the modifications of the target at 110, can represent the color adjustments so that changes directly to the raw footage and/or target clip are not necessary. Further, the color editor can toggle the adjustments on and off while perfecting the colors on the raw footage using the color matte as a reference point. The decision can be made at 112 to determine if all the frames of the target frames have been analyzed. If so, the process continues, otherwise the process increments to the next frame or set of frames at 114 and the process can return to step 106.

When creating the dataset, preprocessing can be performed at 116 on the color-corrected video prior to transmitting it to the machine learning module ("MLM") at 118. The MLM preforms learning according to the dataset including learning when to color correct a target frame into a color corrected frame. The raw video is converted into individual frames because the machine learning approach requires image inputs. Rather than use every frame of the raw video, a sample can include approximately 500 frames at equal time intervals from short slips (e.g. 2-minute clips). A correction mask 206 can be created at 120 representing the difference between the corrected image and the original image. This approach predicts the correction mask then adds it to a raw image to form the predicted color-correct image at 122 and 124. The correction mask calculated above is not a true image type because it contains information about both the addition and subtraction of color, whereas true images only contain information about the addition of color. Therefore, the correction mask is shifted and rescaled into a format that can be expressed as an image. The transformed correction masks are saved to a computer readable medium and then transmitted to the machine learning module. The corrected image can then be broadcast at 126. In one embodiment, the target clip can be in the video channel 1, the adjustment layer can be in video channel 2 and the matte can be in the video channel 3.

A frame or other target clip can include a preferred view of the target color (e.g. a jersey, helmet, graphic, product, label, etc.). The color management software system can allow for changes in hue, saturation, and lightness (HSL) and allows selection of the target color directly on raw footage in the program window so that the user can see the changes in real time. This functionality can allow for the selection of all the pixels in the frame that closely match the selected target color without having to manually select each pixel. Once the selection is as close as possible to grabbing only the desired color, the data collection and annotation module can allow a fine tuning of the selected target color using changes in HSL or other color representations of the selected color. Continued adjustments can be made to ensure that only the target color is highlighted, and all other colors remain untouched by the adjustment layer. The results Once the selection is approved, a correction wheel can be used to adjust the color of the selection. In one embodiment, this will only adjust the HSL values of the color previously selected. The RGB values can also be selected for adjustment. In the color management software system, the color matte can be used as a visual comparison for matching. The process can continue to be modified as needed and any added pixels will also receive the set adjustment. Once corrections have been completed, the entire clip can be exported as a video file.

Referring to FIG. 3, an example of an original image 300, a corrected image 302, and the corresponding correction mask 304 output by the preprocessing steps described herein is shown. As shown in this example, only the appropriate regions of the color on the target (e.g. those near the specified color) receive color corrections prior to the broadcast of the image. In this example, the target color is principally on the jerseys.

In this system, it is preferred that images be expressed in a purely numerical format. Therefore the system, in one embodiment, can be configured to express images as 3-dimensional arrays of shape ($N_h$, $N_w$, 3), where $N_h$ is the height of the image measured in pixels, $N_w$ is the width in pixels, and 3 can be the number of color channels (red, green, and blue). Each entry in the array represents the intensity of a particular color channel for a particular pixel. This intensity can be expressed either as a real number in the range [0,1] or as an integer in the range [0, 255] where the lower end corresponds to the absence of any intensity in that color channel.

The system includes a machine learning module that generally maps from inputs x, to outputs y that depends on a set of parameters (or weights) W. This relationship can be expressed: $y=f(x, W)$. In the present invention, this function is represented using neural networks. This system uses distinctive parameters W that are chosen in order to match as closely as possible to a known set of (x, y) pairs. The set of pairs can be described as the "training data set." In operations, the values of W are determined from a training dataset where x and y are known, then applies the model in a context where only x is known. It is preferred that the training set is large and diverse in order to improve the model performance.

In operations, x represents the color-incorrect input image of shape ($N_h$, $N_w$, 3) and y represents the correction mask of the same shape. The machine learning module that can be used to represent the function is f(x. W). The task of this function is to examine the image x and determine the appropriate correction mask y.

The machine learning module can use a convolutional neural network (CNN) for the image data. Rather than treating the entire image as a list of unrelated numbers, CNNs can process small windows of the image simultaneously and feed the output associated with a small window to subsequent layers of the network. This approach preserves and uses spatial structure within a layered framework that can represent complex nonlinear relationships between regions of the image. The system can propagate information through subsequent layers but with the added benefit that information about a specific region of the image is progressed forward through the network.

In the color-correction task, the output can be a 3D array with shape ($N_h$, $N_w$, X) representing the color mask where X can be 3 in one embodiment. This can be called a pixel-level regression task. In this system, color itself is a low-level concept, because it relates to specific pixels, but weather conditions or which team is playing are high level concepts, because the model must examine and combine information from multiple parts of the image.

There are many different types of operations or "layers" that are sequenced together to form different deep neural network models in this system. These include:

Convolution: This operation maps a window from the previous step into a new pixel value. By sliding the window over the entire image, a new image is created. By using multiple "convolution kernels" this operation can produce arbitrarily many new "channels." The different channels, which are represented by the different overlapping rectangles, can represent different information about the previous layer. For example, in the first set of Convolution Features, one channel may represent the edges in the image while another may represent the appearance of a particular color. Thus, the convolution process encodes the raw pixel information into more conceptual information.

There is also Batch Normalization: This operation scales the mean value and standard deviation of each channel from the subsequent step by shifting and scaling the value for each pixel. This operation has been shown to improve the accuracy and stability of neural networks.

There is also Rectified Linear Unit (ReLU): This operation sets to zero all negative pixel values in the previous step and leaves positive values unchanged. This is an example of a non-linear activation function which is necessary for the network to represent complex behavior such as coloration of the input image conditioned on aspects of the image.

There is also Dropout: This operator randomly removes a portion of the connections between subsequent layers of a network during training. This forces the network to learn a more robust representation since certain pieces of information can be missing for a given prediction.

Figure 4A:
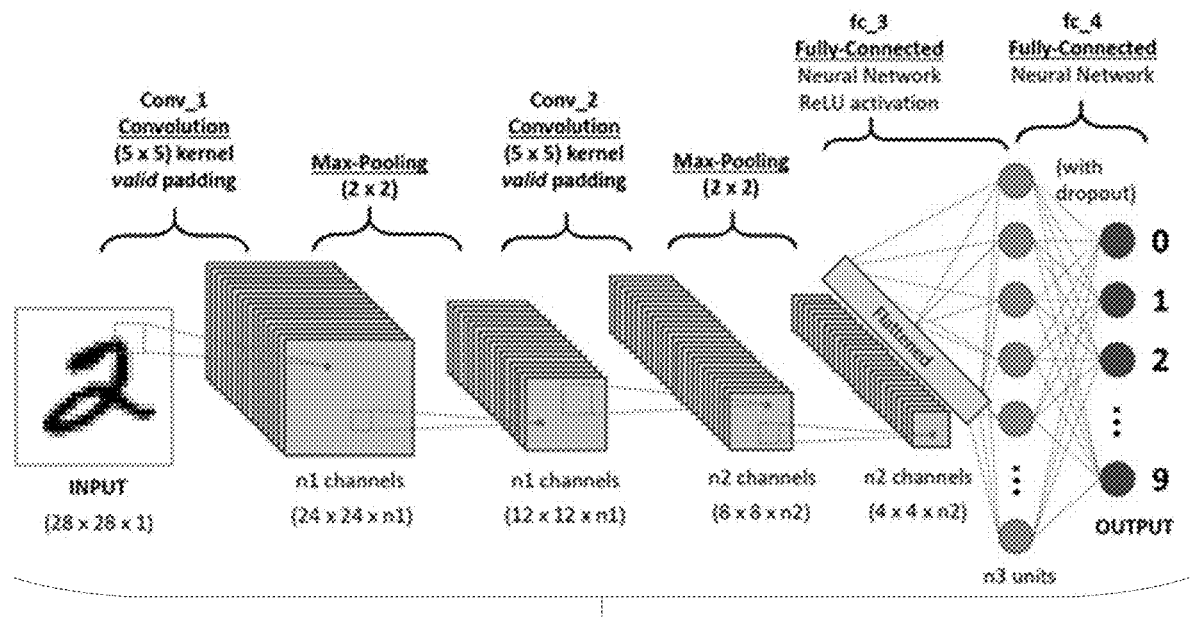
FIG. 4A is a schematic of aspects of the system.
Figure 4B:
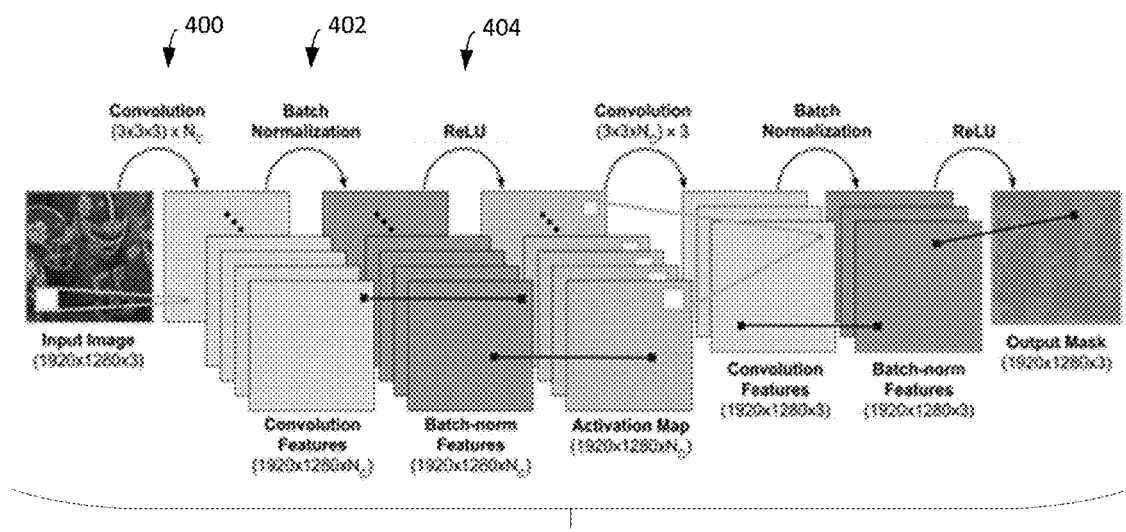
FIG. 4B is a schematic of aspects of the system.

Referring to FIGS. 4A and 4B, CNN architecture of the system that can be used for color correction of 1080p images is shown. This network performs a sequence of Convolution 400, Batch Normalization 402, and ReLU operations 404 on the input image. Optionally, a dropout layer may be placed directly after the green-colored Activation Map layer to help model training. The final layer of the network is the correction mask. This system can be much simpler than many neural network architectures commonly used in machine learning applications. For example, this system may only have 62 parameters. In contrast, ResNet-34, a common architecture for image processing, has 21.282 million parameters. Therefore, this system provides results that are virtually identical to more complex models while being much faster allowing for real-time color correction tasks. The success of this simple model suggests that the color correction task for the current dataset can be achieved without the use of high-level concepts such as weather. Further, this system can be modified for higher level abstractions.

This system can include a stochastic gradient descent to fit the system to the available training data. Batches of images are propagated through the system, an error is calculated for each batch, and the weights of the network are updated to reduce the error. This process is repeated until convergence. For the error calculation, the system can use Structural Similarity (SSIM) metric. For the weight update procedures, the Adam optimizer can be used.

The system results have been validated using a method of withholding 20% of the available data for testing. Rather than selecting a random sample, the last 20% of each available 2-minute video clip is withheld. The machine learning module is trained on the remaining 80% and the results are tested against the withheld data. It should be noted that random sampling is not desirable because consecutive frames are highly correlated, and random sampling may result in consecutive frames appearing in the training and test set, leading to overly optimistic test results. Structural Similarity (SSIM) and Mean Absolute Error (MAE) metrics can be used to evaluate how similar the predicted correction masks are to manually create masks for the 20% test set. The SSIM score ranges from −1 to 1 with a score of 1 corresponding to a perfect prediction. MAE ranges from 0 to infinity with a score of 0 corresponding to a perfect prediction.

Once the training set is completed, the system can include a software and hardware platform that can receive the video stream, use the dataset and provide a corrected output video stream. The video streaming system can connect to a digital video feed made available through the host system. Each frame from the video feed is processed by the system to produce a color-corrected version by providing a preprocessing of the input frame using the system, providing for a prediction of a correction mask and construct a color-corrected image from correction mask and input image. The resulting color-corrected images are then reconstructed into a video feed that can be streamed to output devices from the host system.

The system can be computationally intensive so that to improve performance, calculations made in parallel on a Graphics Processing Unit (GPU) are desirable. This also has the benefit of freeing the CPU to carry out other tasks that cannot be moved to the GPU such as reading the video stream from the input device. In addition, a system can have a fast CPU with many cores in order to process those tasks that cannot easily be moved to the GPU. Cameras can have specialized protocols and hardware for encoding, moving, and decoding video data. Depending on the expected video inputs and outputs, specialized hardware may be needed to interface the system with the capture device (e.g. camera).

During a live broadcast, failure to provide the image in real-time can be harmful the brand owner, event host, audience, and others. Therefore, maintaining operational continuity of the video feed can be an important task. The system can include the ability to control the signal path with a solid-state relay that can bypass the color correction system in the event of a power failure of the system. The system can include a monitoring and refinement component, where the model is regularly validated, and new data sources are added as needed to adjust for the new conditions. This functionality can reduce the chances that performance is degraded as new conditions are introduced into the system that were not present at the time the model was trained. The system can be configured so as not to output video feed that is grossly incorrect. Because machine learning modules are a form of statistical modeling, there is the possibility that the model outputs visual artifacts or grossly incorrect images at times. These can be mitigated by including rules which check the output of the model and defer to the raw video feed if the rules are violated. These rules can be specific to the application context. The system can be used in multiple contexts such as for multiple sports teams. Because this system is based on machine learning, it may be necessary to obtain relevant training data for each new application context and to update the machine learning module to suit that new context.

EXAMPLE

In this example, a sporting event was the application and the brand owners are focused on the jersey colors. The initial dataset was developed from a systematic sampling of one game: a rainy night game. An additional game with sunny, daytime conditions is the next dataset that will be used to further broaden the training data. In the meantime, a manual "intensity" adjustment has been added to the model to allow it to color correct in different lighting and weather conditions. A melt of a game includes all the key plays from multiple angles and varies in length from twenty minutes to seventy-five minutes. The rainy game used for the first dataset was twenty minutes long or 35,100 frames. It was unnecessary to color correct every frame of a game because broader machine learning benefits from a wider variety of scenarios rather than multiple versions of the same scenario. 120 seconds (7200 frames) were pulled as a separate "working" clip every five minutes. This sampling was chosen to capture smaller samples of footage across the widest amount of camera, lighting, and weather changes.

The system used in the above example is an embedded System-on-Module (SoM) AI developer kit sold under the product name NVIDIA Jetson Nano. This device has a 128 CUDA core GPU, a quad-core ARM64 processor, 4 GB of LPDDR4 memory, and a passive heatsink. The module supports 10 W module power usage. The developer kit comes attached to a carrier board that contains a slot for a Wi-Fi card, four USB Type A ports for connected peripherals, GPIO pins, and fan headers. The prototype is powered by a 20 W PSU.

External features include a plastic-based 3D printed housing to enclose the board, two RP-SMA antennas for the wifi chip, and a 5V fan for the heatsink. In addition, an external USB solid state drive was used for swapping memory since SD cards are not well suited to this task. Other peripherals include an external monitor, mouse, keyboard, and webcam for demo.

The software used on the Jetson Nano is built upon components from the NVIDIA JetPack SDK which contains a Linux operating system derived from Ubuntu called NVIDIA L4T. The NVIDIA JetPack SDK also contains some of the necessary libraries and APIs for developing machine learning applications. Other libraries needed for the project's specific use case were compiled on the system using online resources. These components, along with the operating system, are stored on a 128 GB microSD card.

Using this system, the example above resulted in successful reproduction of the correction masks. Table 1 below outlines model performance, both in terms of prediction fidelity and speed of the system's model for different choices of the number of convolution channels $N_C$. The model fidelity captured by the mean absolute error (MAE) and structural similarity metrics (SSIM) both show overall improvement with increasing values of $N_C$, while the frames per second (FPS) on the prototype device declines. A consumer-level hardware system can be designed to address these performance needs.

TABLE 1

| $N_C$ | MAE | SSIM | FPS 320 p |
|---|---|---|---|
| 1 | 0.013317 | 0.905497 | 11.9 |
| 2 | 0.016014 | 0.906256 | 11.4 |
| 4 | 0.012600 | 0.909482 | 10.4 |
| 8 | 0.012224 | 0.914459 | 08.7 |

Figure 5:
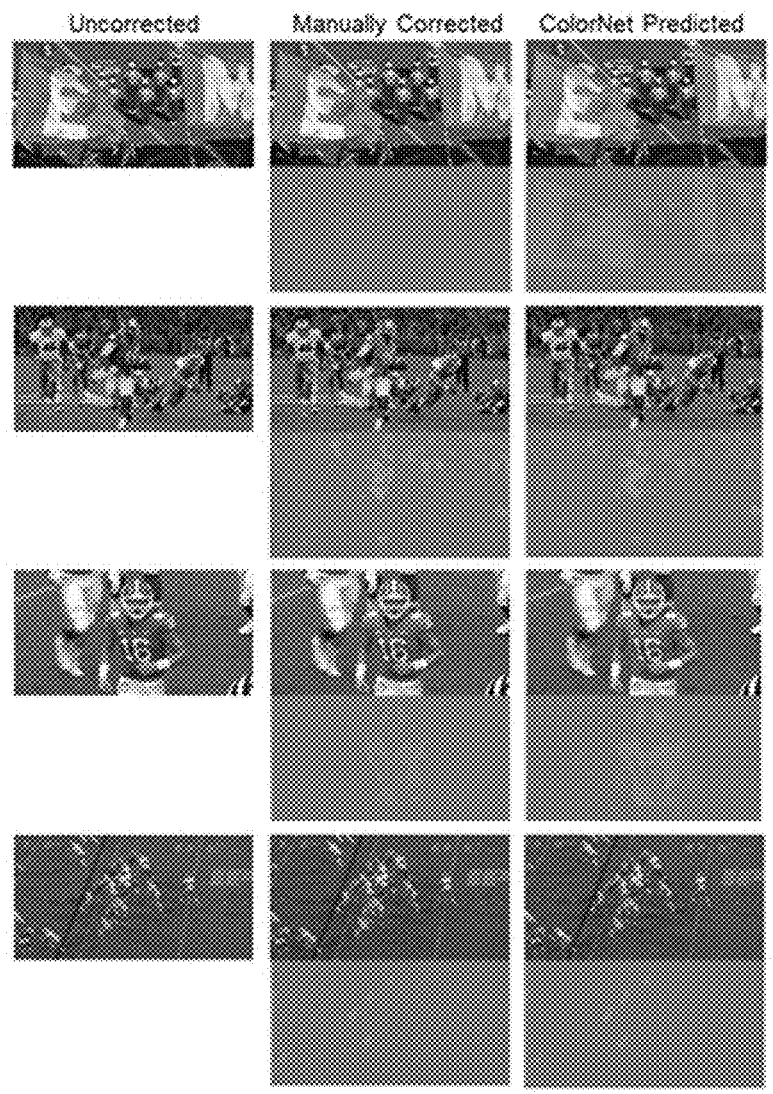
FIG. 5 are examples of the results of the system.

FIG. 5 illustrates the system's predictions for several images from the 20% test data set using the $N_C$=1 model from the table above. The system, in this example, color corrects the orange regions of the image while leaving the rest of the image mostly unchanged.

One hardware configuration is shown in the following Table 2.

TABLE 2

| Component | Device |
|---|---|
| CPU | Intel i9 9900x |
| CPU cooler | Corsair H150i Pro |
| Motherboard | EVGA X299 FTW K |
| Memory | Corsair Dominator 32GB |
| GPUs | 2x EVGA RTX 2080ti |
| Storage | Samsung 970 EVO iTB |
| Power Supply | EVGA 1000W Plat Cert |
| Case | NXXT H7 10i |
| PCIe Capture Card | AverMedia 4k60p |
| Uninterruptible Power Supply | CyberPower 1500VA |
| Operating System | Windows 10 Pro |
| NVLink Bridge | RTX NVLink Bridge |

This system is a solution for automatic, real-time color correction for large format displays where color correctness is desired. This system provides modern techniques including those from artificial intelligence to identify regions of the image with incorrect color and to adjust those colors as appropriate to maintain brand specifications. Unlike traditional approaches to color correction, this system performs color correction on-the-fly, in real-time, automatically adjusting to scene changes such as camera angle adjustments and lighting changes. Moreover, this system only modifies the regions of the image with incorrect coloration, leaving other areas unchanged.

This system can be used for a variety of contexts for color management, including sport events and any other externally facing digital media, such as photography and video content produced and published on the web. The system can also be applied in any context where entities wish to have tighter control over digital brand color presentation.

Figure 6:
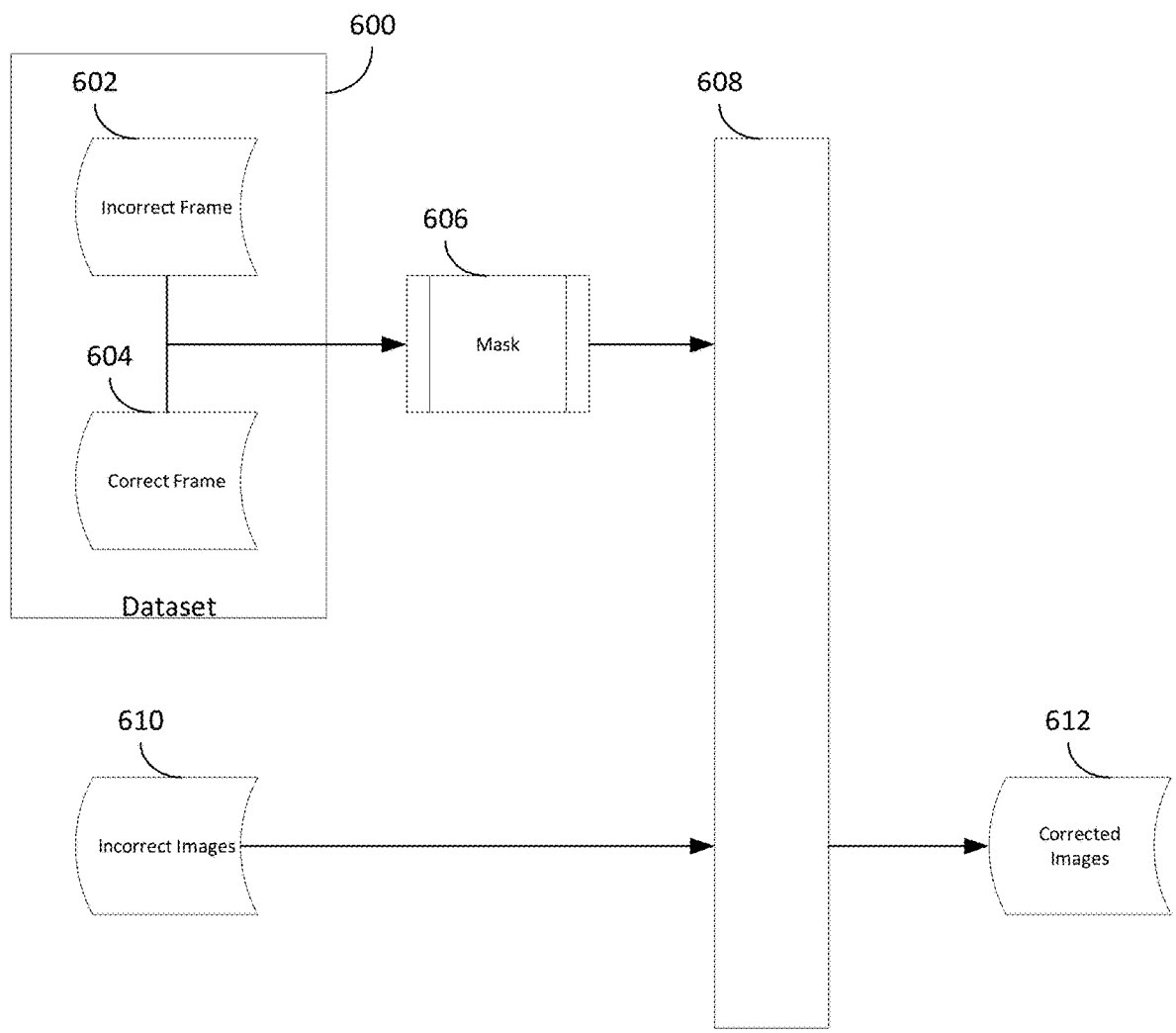
FIG. 6 are examples of aspects of the system.

Referring to FIG. 6, the dataset 600 specific to the target color brand is created as stated herein. The dataset is the results of a processing pair of images that represent the incorrect frame 602 and correct frame 604. From one or more pairs of the frames, a mask 606 is created. This information is provided to the system 608 generating the ability of the system to receive raw video stream 610 and output the corrected video stream 612. In one embodiment, f(x, W) can represent a model having a free parameter W that has can be randomly initialized and can represent an untrained MLM. $S_T$ can be a set of (x, y) pairs that can be used for training the MLM wherein the pairs from $S_T$ can be evaluated by y'=f(x, w) which can be referred to as "inference". The next step can be to evaluate an error between the true values y and the predicted values y' that can be referred to as "loss calculation". The next step can be to modify the values W in order to reduce the error between y and y' which can be referred to as "back propagation". The next step can be to test for convergence. This process can provide for a trained MLM f(x,W*) where the free parameters W* have been updated through the training process.

The system can be validating using the following process. Let f(x, W*) can be the trained MLM resulting from the process above. Let $S_V$ be the set of (x, y) pairs set aside for validation that can be a validation dataset. For all pairs from $S_V$ evaluate y'=f(x,W*)) (e.g. inference). The system can evaluate error(s) between y and y' using any number of possible error metrics that can include a "loss calculation" used in training. The errors can then be reported. The system can produce one or more scores that can indicate the performance of the model. If the scores are outside a predetermine range or otherwise deemed unsatisfactory, modifications can be made to the details of the learning process.

In operation, the system can analyze a single frame by letting f(x,W*) be the trained MLM resulting from the learning process. x can be a new, uncorrected image that is not present in the pairs in $S_L$ or $S_V$. The system can evaluate y'=f(x,W*). y' can be the correction mask. The system can compute the corrected frame x' by adding the correction mask to the original image and report the corrected frame x'. In the case of a video feed, let f(x,W*) be the trained MLM resulting from the learning process. Let V={$x_1$, $c_2$, . . . , x_N} represent a video with uncorrected frames $x_1$, $x_2$, . . . , x_N where x_i is not in $S_L$ or $S_V$ for every i. For i in the range 1 to N, the system can evaluate $y_i$=f($x_i$, W*). The system can compute the corrected frame $x_i$, by adding the correction mask to the original image and reported the corrected frame $x_i$. The results can be used in real-time or for post-hoc correction. For post-hoc correction, a corrected video V'={$x'_1$, $x'_2$, . . . , x_n'} can be produced and reported.

For video stream color correction, the system can be placed in line at several points in the video capture and display process.

Figure 7A:
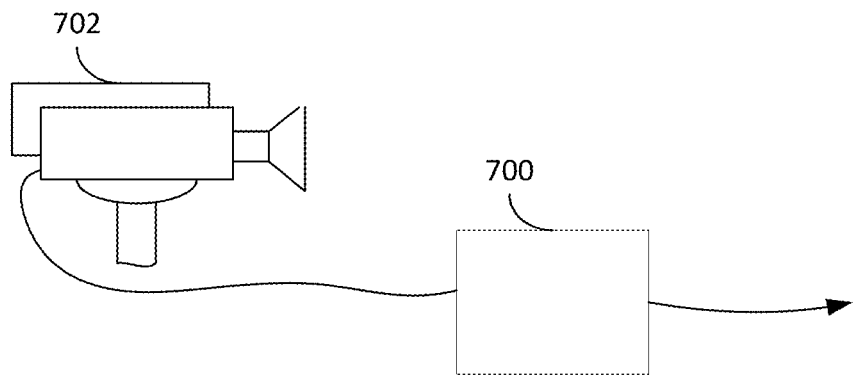
FIG. 7A are examples of aspects of the system.
Figure 7B:
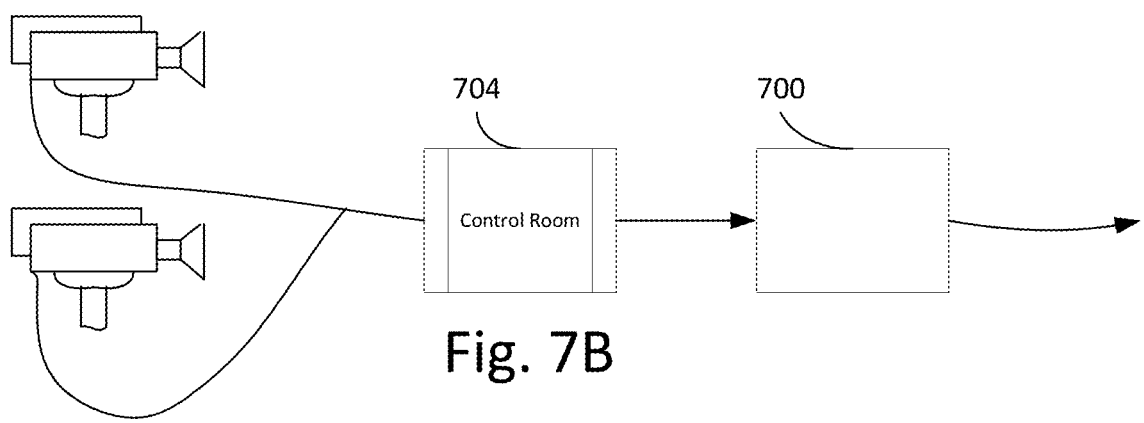
FIG. 7B are examples of aspects of the system.
Figure 7C:
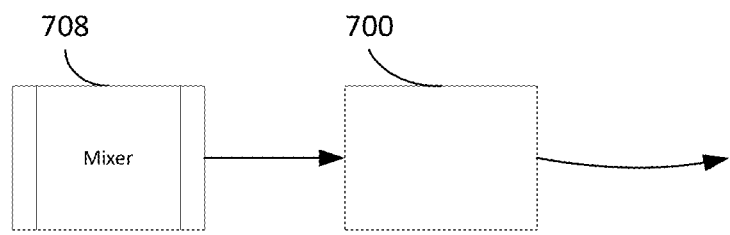
FIG. 7C are examples of aspects of the system; and,
FIG. 7D are examples of aspects of the system.
Figure 7D:
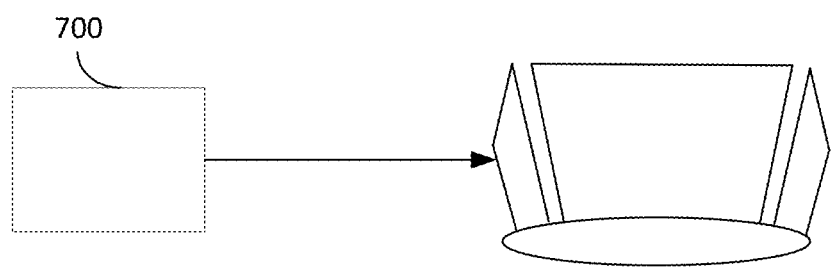

Referring to FIG. 7A, the processing system 700 can be placed immediately downstream from the capture device (e.g. video camera) 702. The system can also be integrated into the video camera itself. In this configuration, each capture device can include the system so that the video stream from the capture device itself is color corrected at the video stream source. Referring to FIG. 7B, the system can be placed downstream of the control room where multiple video feeds enter the control room 704 and prior to being broadcast to a mixer or the display itself, the video feed is color corrected by the system. Referring to FIG. 7C, the system can be placed downstream of the mixer where multiple video feeds enter the mixer 708 and prior to being transmitted to the display, the video feed is color corrected by the system. Referring to FIG. 7D, the system can be placed adjacent to the display itself and even be integrated into one or more displays so that the video feed into the display is color corrected.

The above description is shown generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives. A module can be hardware, software, or both.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A system for color management of a targeted color in an image comprising:
   a processing system in communications with a video capture device;
   a dataset in communications with the processing system generated by a machine learning module wherein the machine learning module includes a pair of images wherein a first image is a training original image and a second image is a training color corrected image;
   an adjustment layer created according to the dataset; and,
   a set of computer readable instructions for:
      receiving an original image from the video capture device,
      retrieving an adjustment layer according to the dataset,
      applying the adjustment layer to the original image to create a color corrected image, and
      transmitting the color correct image to a display device.

2. The system for color management of claim 1 wherein:
   the original image is a first original image of an original video feed;
   the color correct image is a first color correct image of a color corrected video feed;
   set of computer readable instructions include instructions for receiving a second original image from the video capture device, applying the adjustment layer to the second original image to create a second color correct image, and, transmitting the second color correct image to the display device.

3. The system for color management of claim 2 wherein:
   the first original image and the second original image are included in a first original video feed;
   the first color correct image and the second color correct image are included in a color corrected video feed; and,
   the set of computer readable instructions include instructions for transmitting the color corrected video feed to the display device.

4. The system for color management of claim 3 including:
   a computer readable media in communications with the processing system;
   a correction mask stored on the computer readable media wherein the correction mask represents a region of the first original image to receive color correction; and the set of computer readable instructions include instructions for retrieving the correction mask from the computer readable media and applying the adjustment layer to a region of the first original image.

5. The system for color management of claim 4 including:
a computer readable media in communications with the processing system;
a correction mask stored on the computer readable media wherein the correction mask represents a region of the original image to receive color correction; and
the set of computer readable instructions include instructions for retrieving the correction mask from the computer readable media and applying the adjustment layer to the region of the original image.

6. The system for color management of claim 5 wherein the correction mask representing an addition and subtraction of color between the original image and the color corrected image.

7. The system for color management of claim 5 wherein the correction mask is shifted and rescaled to represent a correction image.

8. The system for color management of claim 5 wherein the correction mask represents changes to an attribute taken from the group consisting of hue, saturation, lightness, or any combination thereof.

9. The system for color management of claim 1 wherein the set of computer readable instructions includes applying the adjustment layer to the original image to create a color corrected image according to a correction mask.

10. The system for color management of claim 9 wherein the correction mask represents a region of the original image to receive color correction.

11. The system for color management of claim 1 including a machine learning module is configured to receive a plurality of frames from an original video feed and apply a correction mask to a set of target frames included in a target video feed.

12. The system for color management of claim 11 wherein the machine learning module is configured to use convolutional neural network for processing the original video feed.

13. The system for color management of claim 11 wherein the machine learning module includes modules taken from the group consisting of convolution, batch normalization, rectified linear unit, drop out or any combination thereof.

14. The system for color management of claim 11 wherein the machine learning module includes a stochastic gradient descent configured to analyze the original video feed.

15. The system for color management of claim 1 wherein the set of computer readable instructions include instructions for applying the adjustment layer to an original video feed to create a color correct video feed.

16. The system for color management of claim 1 wherein the processing system is disposed in-line with the video capture device.

17. The system for color management of claim 1 wherein the processing system is disposed between the video capture device and a display.

18. The system for color management of claim 1 wherein the processing system is included in the video capture device.

19. The system for color management of claim 1 wherein the processing system is disposed in a display device.

20. The system for color management of claim 1 wherein
wherein the video capture device is a first video capture device;
wherein the original image is a first original image from the first video capture device;
wherein the set of computer readable instructions include instructions for applying the adjustment layer to a second original image to create a second color correct image, and,
transmitting the second color correct image to the display device.

21. A system for color management of claim 1 including:
wherein the original image is included in an original video stream;
wherein the color corrected image is included in a color corrected video stream; and,
the set of computer readable instructions include instructions for applying the adjustment layer to the original video stream to create a color corrected video stream.

22. A system for color management of a targeted color in a video stream comprising:
a set of non-transitory computer readable instructions stored on a computer readable media that, when executed by a processor, preform the steps of:
receiving an original video feed from a video capture device,
retrieving a dataset from the computer readable media having a plurality of paired images where a first image of each pair of the paired images is an original training image and a second image of each pair of the paired images is a color corrected training image representing modifications to the original training image in response to matching a target color,
retrieving a correction mask from the computer readable media; and,
correcting a color of the original video feed according to the dataset, the correction mask, and a machine learning module to produce a color corrected video feed.

23. The system for color management of claim 22 wherein the machine learning module includes modules taken from the group consisting of convolution, batch normalization, rectified linear unit, drop out or any combination thereof.

24. A system for color management of a targeted color in a video stream comprising:
a set of non-transitory computer readable instructions that, when executed by a processor, preform the steps of:
receiving an original video feed,
applying an adjustment layer created according to a dataset having a plurality of paired images where a first image of each pair of the paired image is an original training image and a second image of each pair of the paired images is a color corrected image representing modifications to the original training image in response to matching a target color to the original video feed, correction mask and a machine learning module to create a color correct video feed, and,
transmitting the color correct video feed to a display.

25. The system for color management of claim 24 including a machine learning module that includes modules taken from the group consisting of convolution, batch normalization, rectified linear unit, drop out or any combination thereof.

26. The system for color management of claim 24 including:
a correction mask representing a region of a frame included in original video feed to receive color correction; and
the set of non-transitory computer readable instructions include instructions for retrieving the correction mask from a computer readable media and applying the adjustment layer to a region of the frame.

* * * * *